(12) United States Patent
Ogino (10) Patent No.: US 6,381,262 B1
(45) Date of Patent: Apr. 30, 2002

(54) INFORMATION SIGNAL PROCESSING UNIT (75) Inventor: Akira Ogino, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/097,732

(22) Filed: Jun. 16, 1998

(30) Foreign Application Priority Data

Jun. 17, 1997 (JP) .............................................. 9-159561
Jun. 19, 1997 (JP) .............................................. 9-162435

(51) Int. Cl.[7] .......................... H04B 15/00; H04K 1/00; H04L 27/30
(52) U.S. Cl. ........................ 375/147; 375/141; 713/200; 370/527; 348/469; 386/94
(58) Field of Search ................................. 375/141, 147, 375/140; 348/473, 469, 465; 386/95, 94, 64; 360/60, 15, 2; 380/203, 3, 5; 370/527, 515, 529; 713/200, 193, 202

(56) References Cited

U.S. PATENT DOCUMENTS

| | | | | |
|---|---|---|---|---|
| 5,319,735 A | * | 6/1994 | Preuss et al. ................. 704/205 |
| 5,513,260 A | * | 4/1996 | Ryan .............................. 380/3 |
| 5,960,398 A | * | 9/1999 | Fuchigami et al. .......... 704/270 |
| 5,982,977 A | * | 11/1999 | Naruse et al. ................. 386/64 |
| 6,023,551 A | * | 2/2000 | Sugita et al. .................. 386/94 |
| 6,058,243 A | * | 5/2000 | Ogino et al. ................... 386/94 |
| 6,069,665 A | * | 5/2000 | Ikeda et al. .................. 348/478 |
| 6,101,051 A | * | 8/2000 | Sugita et al. ................... 360/2 |
| 6,112,008 A | * | 8/2000 | Sugita et al. .................. 386/94 |
| 6,163,565 A | * | 12/2000 | Moriwaki et al. ........... 375/141 |
| 6,195,129 B1 | * | 2/2001 | Ogino et al. ................. 386/469 |
| 6,204,981 B1 | * | 3/2001 | Ogino et al. ................... 360/60 |
| 6,215,953 B1 | * | 4/2001 | Shin .............................. 386/94 |
| 6,253,020 B1 | * | 6/2001 | Ogino et al. ................... 386/94 |
| 6,263,153 B1 | * | 7/2001 | Ogino et al. ................... 386/94 |
| 6,282,654 B1 | * | 8/2001 | Ikeda et al. .................. 713/200 |
| 6,295,303 B1 | * | 9/2001 | Ogino et al. ................. 370/527 |

FOREIGN PATENT DOCUMENTS

| EP | 0360615 | 9/1989 |
|---|---|---|
| EP | 0778566 | 6/1997 |
| EP | 0843471 | 5/1998 |

OTHER PUBLICATIONS

Phillip C. Blum and Mark S. Nowak, "Spread Spectrum Copyright Protection for Multimedia", Mar. 1997.

* cited by examiner

Primary Examiner—Chi Pham
Assistant Examiner—Phuong Phu
(74) Attorney, Agent, or Firm—Jay H. Maioli (57) ABSTRACT

A new additional information generating section generates new additional information FS1 based upon information from an additional information reading section. The spectrum of the new additional information FS1 is spread by an SS additional information generating section and supplied to a signal superimposing section as SS additional information SF1. The signal superimposing section generates a digital video signal S2 by superimposing the SS additional information SF1 on a digital video signal S1. A writing section records the digital video signal S2 on which the SS additional information SF1 is superimposed on a recording medium. Hereby, adding additional information to an information signal without deteriorating the quality of the read information signal so that the falsification and deletion are disabled, detecting the additional information added to the information signal if necessary and utilizing it are enabled.

2 Claims, 8 Drawing Sheets

INFORMATION SIGNAL PROCESSING UNIT

BACKGROUND OF THE INVENTION

1. Field of the Invention

The present invention relates to an information signal processing unit for detecting additional information from an information signal to which the additional information is added and processing it.

2. Description of the Related Art

Recently, a reproducing unit for a digital video tape recorder (VTR) and a digital video disc (DVD) and software reproducible using these units are provided in numbers, digitized video signal and aural signal can also be reproduced readily at home, and an image and a sound/voice respectively excellent in the quality of an image and a sound/voice can be reproduced.

Digitized video signal and aural signal or a program are plentifully provided via a recording medium such as the Internet and a compact disc read only memory (CD-ROM) and digitized software provided via the Internet, CD-ROM and others is widely utilized using a personal computer and others.

However, in the meantime, there is a problem that software plentifully provided as described above and composed of digitized video signals and others may be unlimitedly copied. Therefore, if digitized information, for example a video signal is dealt with, direct copy preventing control such as copy prohibition is executed by adding a copy preventing code to a digital video signal as digital data and recording it on a recording medium.

Not only a copy preventing code for prohibiting or allowing copy is added but a code for limiting the generation of copy is added to a digital video signal and more flexible control over copy is also executed.

Figure 1:
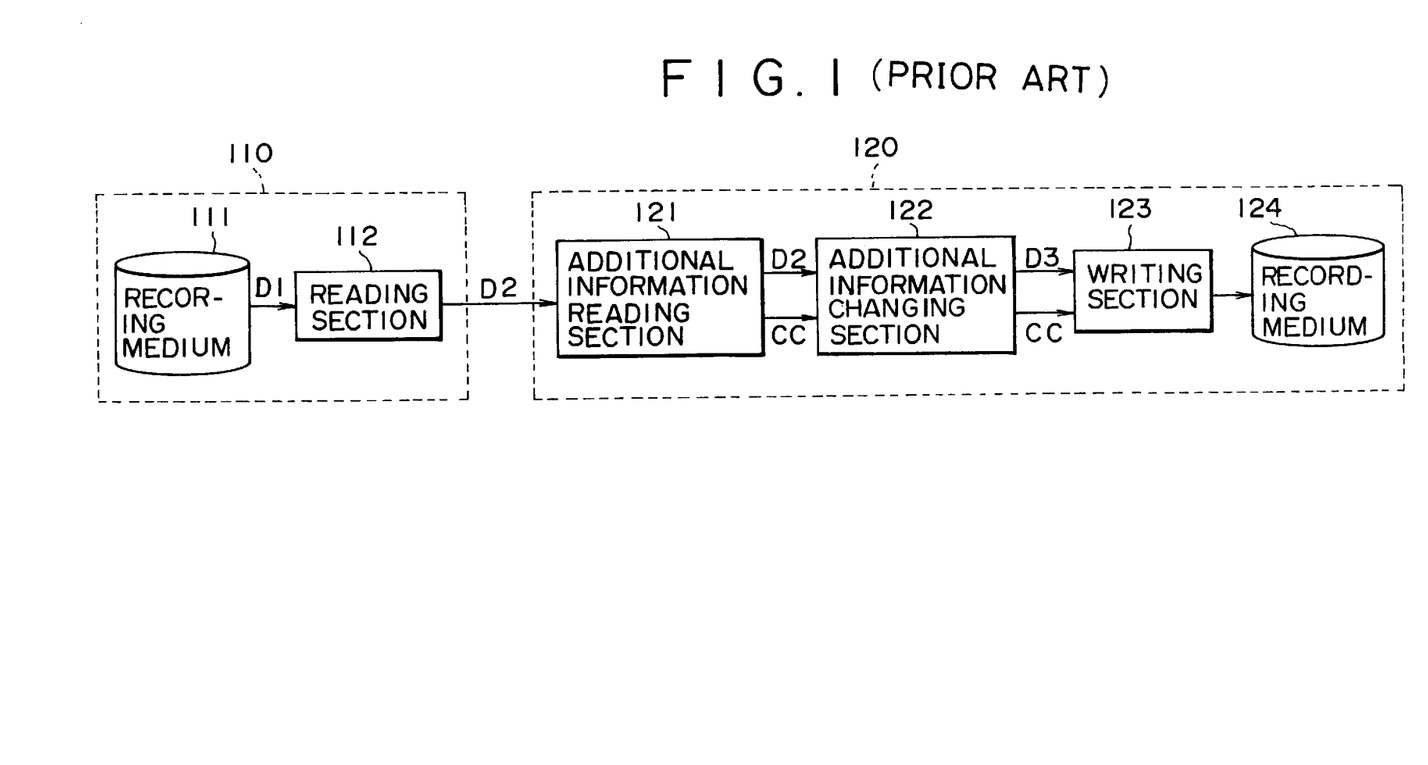
FIG. 1 is a block diagram showing an example of a conventional type copying device.

FIG. 1 is a basic block diagram showing a copy system in case digitized information is dealt and the copy system is provided with functions for sending digital information read by a digital information reading device 110 to a digital information recording device 120, copying information which can be copied, prohibiting the copy of information the copy of which is not allowed and updating the following digital information in case a code for limiting the generation of copy exists in digital information.

Copy control information as additional information is recorded in addition to digital main information in a recording medium 111 installed in the digital information reading device 110. The copy control information is provided with the prohibition or allowance of copy, the limitation of a generation and others as control contents.

The reading section 112 of the digital information reading device 110 generates a digital read information signal D2 composed of digital main information and copy control information added to the digital main information based upon a signal D1 obtained by reading information in the recording medium 111 and sends the above signal to the digital information recording device 120.

The additional information reading section 121 of the digital information recording device 120 detects copy control information CC from the received digital read information signal D2 and sends the detected copy control information CC and the digital read information signal D2 to an additional information changing section 122.

The additional information changing section 122 generates new additional information based upon copy control information CC in case copy control information added to a digital information signal D2 is required to be changed and changes copy control information added to the digital information signal D2 by adding the new additional information to the digital information signal D2.

For example, if copy control information CC is generation limited information of which the copy of only a first generation is allowed, the additional information changing section 122 changes copy control information by generating new copy control information the control contents of which represent the prohibition of copy and adding this new copy control information to the digital information signal D2.

As a result, as described above, a digital information signal D3 to which copy control information changed if necessary is added and copy control information CC are output from the additional information changing section 122 and sent to a writing section 123.

The writing section 123 converts the above digital read information signal D3 to digital information suitable for recording if copy control information CC supplied via the additional information changing section 122 represents the allowance of recording a digital read information signal from the digital information reading device 110 and writes the above converted digital information to a recording medium 124. In the meantime, if copy control information CC from the additional information reading section 121 represents the prohibition of copy, the wiring section 123 does not record the above digital read information signal D3.

Further, if copy control information CC from the additional information reading section 121 represents that the copy of only a first generation is allowed, the digital read information signal D3 to which new copy control information is added by the additional information changing section 122 as described above is converted to digital information suitable for recording and is written to the recording medium 124. In this case, a digital information signal cannot be copied using a copied recording medium 124.

As described above, in the case of so-called digital connection that a main information signal and copy control information as additional information are supplied to the recording device as a digital signal, the recording device can securely execute copy preventing control such as the prohibition of copy using copy control information because copy control information is included in transmitted digital data.

As described above, even if information recorded in a recording medium in which a digital video signal as a main information signal and copy control information as additional information are recorded is read using a digital reading device and copy control information is obtained together with a digital video signal, only a digital video signal which is a main information signal can be converted to an analog signal via a D/A converting circuit to monitor an image for example and can be output to an analog output terminal to which a picture tube of a monitor is normally connected.

As described above, even if digital information is read by a reading device, a copy control signal is not included in an analog signal output to the analog output terminal. Therefore, in the case of analog connection in which analog VTR and others are connected to an analog output terminal, control over copy based upon copy control information is disabled, for example the copy of a main information signal the copy of which is prohibited is enabled and the limitation of a generation of copy is also disabled.

As copy control information is often added in a header and others separately from a digital video signal as a main information signal even in the case of digital connection, copy control based upon copy control information is disabled and illegal copy is enabled by deleting information in a part to which copy control information is added and falsifying copy control information such as replacing with another information.

Further, it is also conceivable that when copy control information is superimposed or added in a frequency band different from the frequency band of these video signal and aural signal even if a video signal and an aural signal respectively as a main information signal are an analog signal or a digital signal, copy control information is deleted by a simple frequency filter and copy control based upon copy control information is disabled.

Therefore, as described above referring to FIG. 1, as the signal strength of additional information such as copy control information added to a main information signal is weak and additional information cannot be regenerated in case it is once deleted even if more flexible copy control is executed by providing a function for changing copy control information as additional information to the recording device, changing additional information added to an information signal in recording an information signal if necessary and utilizing the changed additional information, a case that additional information added to an information signal cannot be sufficiently utilized occurs.

SUMMARY OF THE INVENTION

The present invention is made in view of the above problems and the object is to enable adding additional information to an information signal without deteriorating the quality of a read information signal so that falsification and deletion are also disabled in a device used by a general user, detecting additional information added to an information signal if necessary and utilizing the additional information.

An information signal processing unit according to the present invention is characterized in that it is provided with reading means for receiving an information signal on which an additional information signal the spectrum of which is spread is superimposed and reading the above additional information signal from the above information signal, additional information signal generating means for generating a new additional information signal based upon the additional information signal read by the reading means, spreading means for spreading the spectrum of the new additional information signal generated by the additional information signal generating means and superposing means for superposing the new additional information signal the spectrum of which is spread by the spreading means on the above information signal and outputting it.

According to the above unit, the spectrum of a new additional information signal is spread and is superimposed on a digital information signal as a wide-band and low-level signal. If the digital information signal is a video signal, the superimposed additional information signal never deteriorates a reproduced image.

Further, as the new additional information signal is superimposed on the digital information signal at the same time and in the same frequency band, it is difficult to falsify or delete additional information by a frequency filter or the simple replacement of information signals.

DESCRIPTION OF THE PREFERRED EMBODIMENTS

Referring to the drawings, embodiments of the present invention will be described below.

First Embodiment

Figure 2:
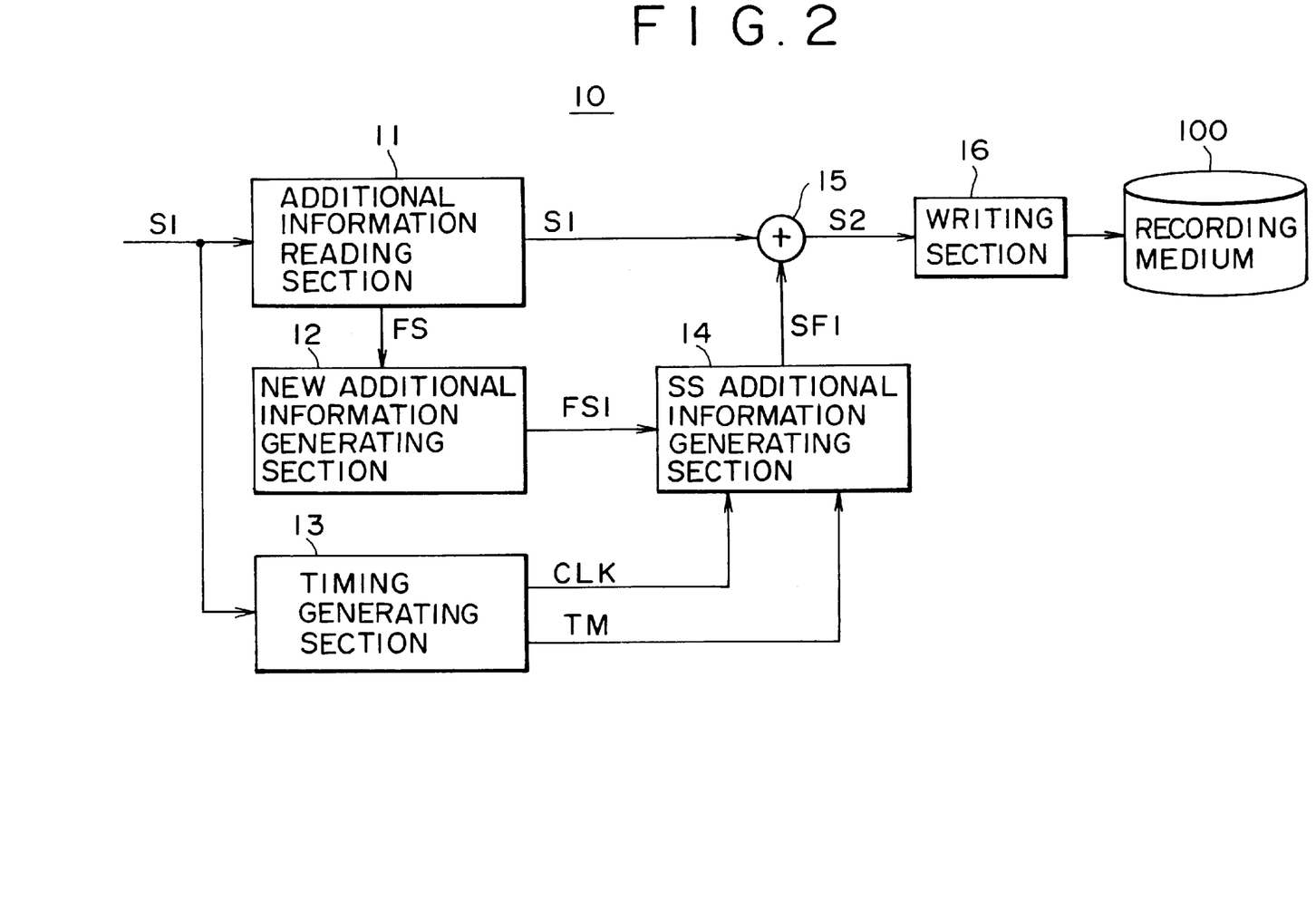
FIG. 2 is a block diagram for explaining an embodiment of an information signal recording device according to the present invention.

FIG. 2 is a block diagram for explaining an information signal recording device 10 equivalent to a first embodiment (hereinafter called only a recording device). The recording device 10 equivalent to the first embodiment receives a digital information signal provided via a network such as the Internet and records it on a recording medium. That is, the recording device 10 is obtained by applying the present invention to a device such as a personal computer which can send and receive an information signal via a network such as the Internet.

Recording Device 10

As shown in FIG. 2, the recording device 10 equivalent to the first embodiment is provided with an additional information reading section 11, a new additional information generating section 12, a timing generating section 13, a spread spectrum (SS) additional information generating section 14, a signal superimposing section 15 and a writing section 16.

A recording medium 100 is a disc such as CD-ROM and DVD to which various digital information signals such as a digital video signal, a digital aural signal and a program are written by the recording device 10. Hereinafter, to simplify description, a digital information signal supplied to the recording device 10 and recorded on the recording medium 100 shall be a digital video signal.

Additional information is added to a digital video signal S1 supplied to the recording device 10 in the first embodiment. The additional information is 1- or 2-bit copy control information representing the contents of copy control over a digital video signal S1 such as the allowance or prohibition of copy and the limitation of a generation.

In the first embodiment, for example, a digital video signal S1 sent via a network such as the Internet and received by the recording device 10 is supplied to the additional information reading section 11 of the recording device 10 and the timing generating section 13.

The additional information reading section 11 reads additional information FS which is copy control information added to a digital video signal S1 from the digital video signal S1, supplies it to the new additional information generating section 12 and supplies the digital video signal S1 to the signal superimposing section 15 as it is.

The new additional information generating section 12 generates new additional information FS1 (hereinafter called new additional information) to be added to the digital video signal S1 based upon the additional information FS from the additional information reading section 11.

In the first embodiment, for example, when additional information FS from the additional information reading section 11 represents the allowance of the copy of only a first generation, the new additional information generating section 12 generates new additional information FS1 representing the prohibition of copy. When additional information FS from the additional information reading section 11 represents the prohibition or the allowance of copy, the new additional information generating section 12 supplies the additional information FS representing the prohibition or the allowance of copy to the SS additional information generating section 14 as new additional information FS1 as it is.

When additional information FS is not read from the digital video signal S1 by the additional information reading section 11 such as additional information is not added to the digital video signal S1, the new additional information generating section 12 detects the above, generates additional information FS1 based upon the number of the recording device 10 such as the serial number of the recording device 10 or ID number of a user of the recording device 10 and supplies it to the SS additional information generating section 14. In the recording device 10 equivalent to the first embodiment, the number of the recording device 10 and ID number of a user are recorded beforehand in a memory with which the new additional information generating section 12 is provided.

As described above, the new additional information generating section 12 generates new additional information FS1 based upon information obtained as a result of processing for reading additional information by the additional information reading section 11 and supplies it to the SS additional information generating section 14.

In the meantime, the timing generating section 13 receives the digital video signal S1, detects a reference timing signal from the digital video signal S1 and generates a timing signal TM and a clock signal CLK respectively used in each section of the recording device 10 equivalent to the first embodiment based upon the detected reference timing signal.

Figure 3:
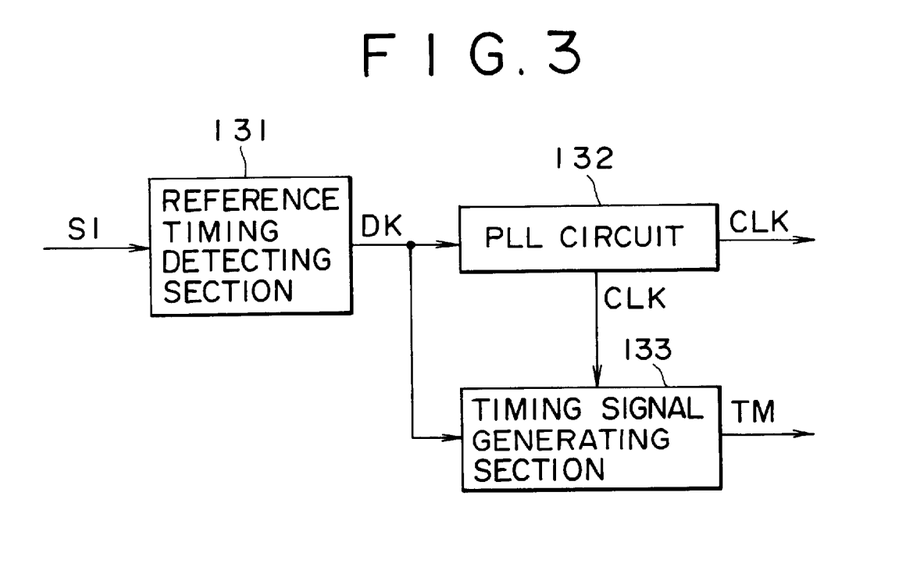
FIG. 3 is a block diagram for explaining a timing generating section in the recording device shown in FIG. 2.

FIG. 3 is a block diagram for explaining the timing generating section 13 of the recording device 10 equivalent to the first embodiment. As shown in FIG. 3, the timing generating section 13 is provided with a reference timing detecting section 131, a phase-locked loop (PLL) circuit 132 and a timing signal generating section 133.

The reference timing detecting section 131 extracts a synchronizing signal DK as a reference timing signal from the digital video signal S1 supplied to the reference timing detecting section and supplies it to the PLL circuit 132 and the timing signal generating section 133.

The PLL circuit 132 generates a clock signal CLK synchronized with the digital video signal S1 based upon a synchronizing signal DK from the reference timing detecting section 131. The clock signal CLK is supplied to the timing signal generating section 133 and each section using the clock signal CLK such as the SS additional information generating section 14 described later.

The timing signal generating section 133 generates and outputs a timing signal TM used by the SS additional information generating section 14 described later and the other various timing signals based upon a synchronizing signal DK from the reference timing detecting section 131 and a clock signal CLK from the PLL circuit 131.

In the first embodiment, a timing signal TM generated by the timing signal generating section 133 is used for a reset (initializing) signal synchronized with a synchronizing signal DS from the reference timing detecting section 131 and showing timing for generating a new additional information string the spectrum of which is spread and a pseudorandom noise (PN) code string provided with a predetermined code pattern used for spreading a spectrum from the head in the SS additional information generating section 14 described later.

For example, if it is set that the reference timing detecting section 131 of the timing generating section 13 extracts a vertical synchronizing signal as a reference timing signal, a clock signal CLK synchronized with a vertical synchronizing signal from the reference timing detecting section 131 is generated by the PLL circuit 132.

The timing signal generating section 133 generates a timing signal TM set so that one vertical interval (one field) is equivalent to one cycle and synchronized with a vertical synchronizing signal used for a reference timing signal based upon a vertical synchronizing signal from the reference timing detecting section 131 and a clock signal CLK from the PLL circuit 132.

A timing signal TM and a clock signal CLK respectively generated by the timing generating section 13 as described above are supplied to the SS additional information generating section 14 as shown in FIG. 2.

The SS additional information generating section 14 receives new additional information FS1, a timing signal TM and a clock signal CLK and generates spread spectrum additional information SF1 which is a spread spectrum signal of the new additional information FS1.

Figure 4:
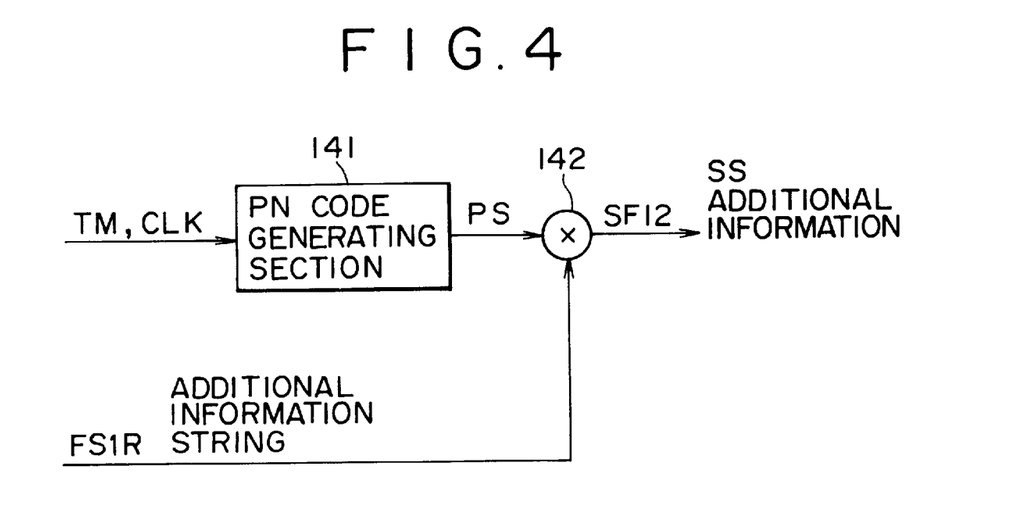
FIG. 4 is a block diagram for explaining an SS additional information generating section in the recording device shown in FIG. 2.

FIG. 4 is a block diagram for explaining the SS additional information generating section 14 in the first embodiment. As shown in FIG. 4, the SS additional information-generating section 14 is provided with a PN code generating section 141 and a multiplying section 142.

The PN code generating section 141 generates a PN code string PS based upon a timing signal TM and a clock signal CLK. That is, in the first embodiment, the PN code generating section 141 generates a PN code string PS from the head in synchronization with a clock signal CLK every time a timing signal TM is supplied and supplies it to the multiplying section 142.

A new additional information string FS1R composed of each bit of new additional information FS1 from the new additional information generating section 12 output by the predetermined number of clocks in synchronization with a clock signal CLK at timing shown by a timing signal TM is supplied to the multiplying section 142.

The multiplying section 142 generates a spread spectrum signal (SS additional information) SF1 which is new additional information the spectrum of which is spread by multiplying the PN code string PS and the new additional information string FS1R.

As described above, the SS additional information generating section 14 is provided with a function as spreading means for converting new additional information FS1 with a narrow band and at a high level to SS additional information SF1 with a wide band and at a low level as also described later by spreading the spectrum of additional information FS1 using the PN code string PS.

Figure 5:
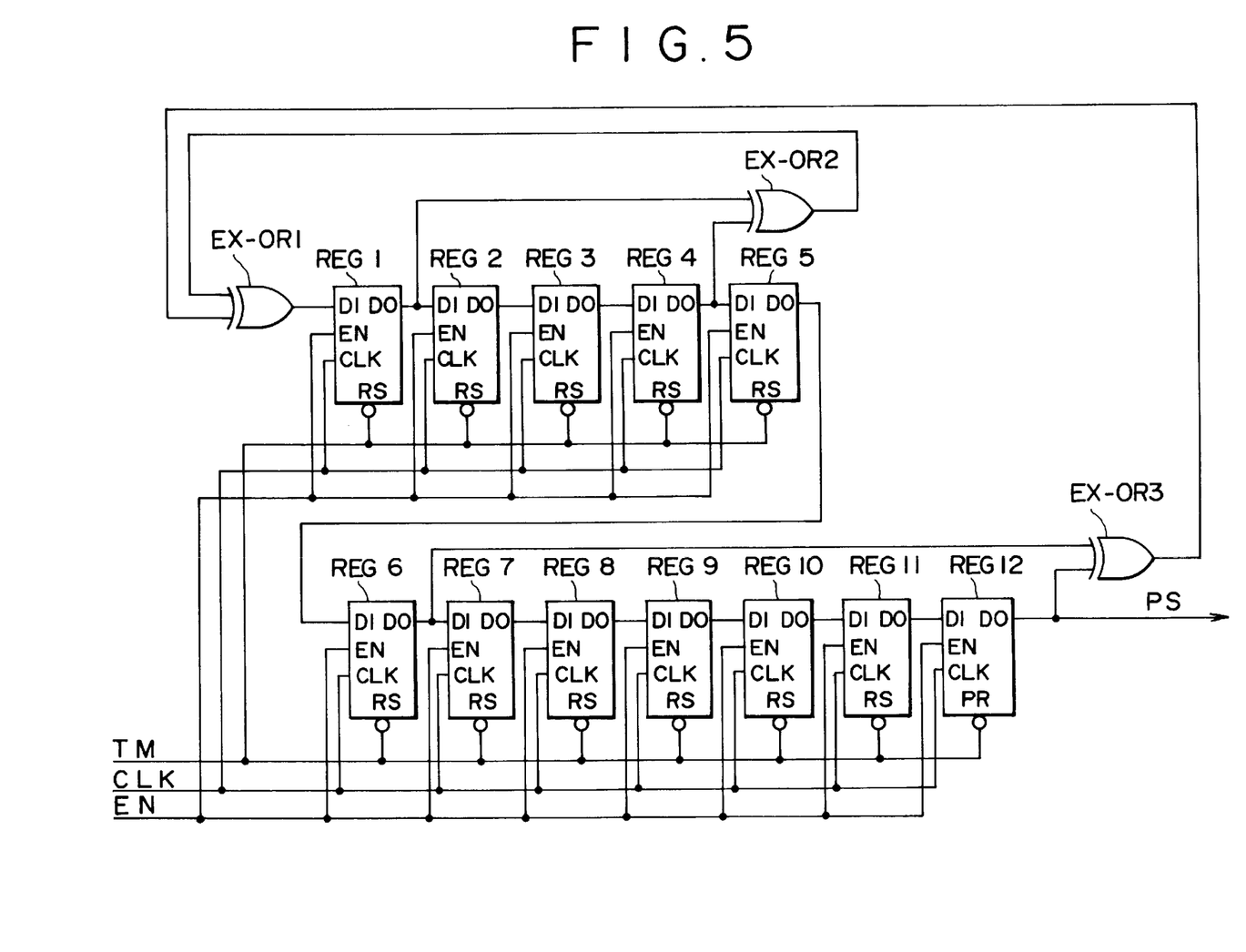
FIG. 5 is a block diagram for explaining an example of a PN code generating section in a part of the SS additional information generating section shown in FIG. 4.

FIG. 5 shows an example of the constitution of the PN code generating section 141 shown in FIG. 4. The PN code generating section 141 in this example is composed of 12 D flip-flop circuits REG1 to REG15 constituting 12 shift registers and exclusive OR circuits WX-OR1 to EX-OR3 for operating the suitable tap output of the shift register. The PN code generating section 141 shown in FIG. 4 generates an M series of PN code string PS based upon a timing signal TM and a clock signal CLK as described above.

An enabling signal EN in FIG. 5 is a signal for operating the PN code generating section 141 and in the first embodiment, the above enabling signal is generated when the recording device 10 shown in FIG. 2 for example is powered on and is supplied to the PN code generating section 141.

SS additional information SF1 obtained from the SS additional information generating section 14 as described above is supplied to the signal superimposing section 15.

The signal superimposing section 15 receives a digital video signal S1 and digital SS additional information SF1 and generates a digital video signal S2 on which the digital SS additional information SF1 is superimposed.

The signal superimposing section 15 superposes SS additional information SF1 on the least significant bit (LSB) of a 10-bit digital video signal and a ninth bit which is a bit next to the least significant bit in case the digital video signal S is composed of ten bits which represent an image equivalent to one picture element for example. As described above, the signal superimposing section 15 superposes SS additional information SF1 on the digital video signal S1 at the same time and in the same frequency band.

In this case, the signal superimposing section 15 prevents SS additional information SF1 from deteriorating the digital video signal S1 by superimposing SS additional information SF1 on the digital video signal S1 by signal power lower than the dynamic range of the digital video signal S1. A digital video signal S2 generated by superimposing SS additional information SF1 on the digital video signal S1 by the signal superimposing section 15 as described above is supplied to the writing section 16.

The writing section 16 receives the digital video signal S2 on which the digital SS additional information SF1 is superimposed, converts it to a digital video signal for recording suitable for recording and writes the digital video signal for recording to the recording medium 100. Hereby, the digital video signal on which the SS additional information SF1 which is new additional information the spectrum of which is spread is superimposed is recorded in the recording medium 100 in addition to the additional information FS added before.

As described below, as the spectrum of new additional information FS1 superimposed on the digital video signal recorded on the recording medium 100 is spread, an image reproduced by the digital video signal is never deteriorated and falsification and deletion are disabled.

Therefore, if a digital video signal recorded on the recording medium 100 is read or a digital video signal read from the recording medium 100 is recorded (copied) on another recording medium, new additional information superimposed on a digital video signal can be securely obtained and utilized such as new additional information the spectrum of which is spread and superimposed on the digital video signal is extracted and copy control is executed according to the new additional information.

FIG. 6 show relationship between additional information which is information such as copy control information and an information signal, a video signal in this example in the shape of a spectrum. The quantity of information included in additional information is small, additional information is a signal the bit rate of which is slow and as shown in FIG. 6A, is a narrow-band signal. When the spectrum of the signal is spread, the signal becomes a wide-band signal as shown in FIG. 6B. At this time, the level of a spread spectrum signal is lowered in inverse proportion to the extension of the band.

Figure 6A:
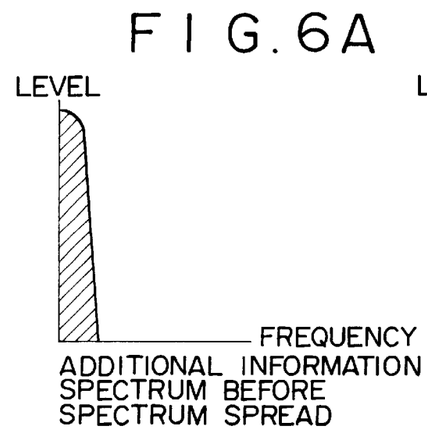
FIG. 6 show relationship between SS additional information (copy control information) and an information signal in the shape of a spectrum.
Figure 6B:
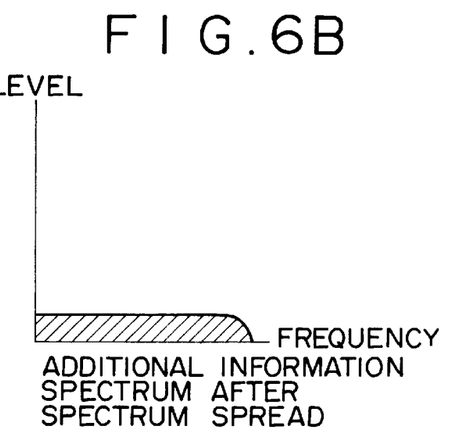
Figure 6C:
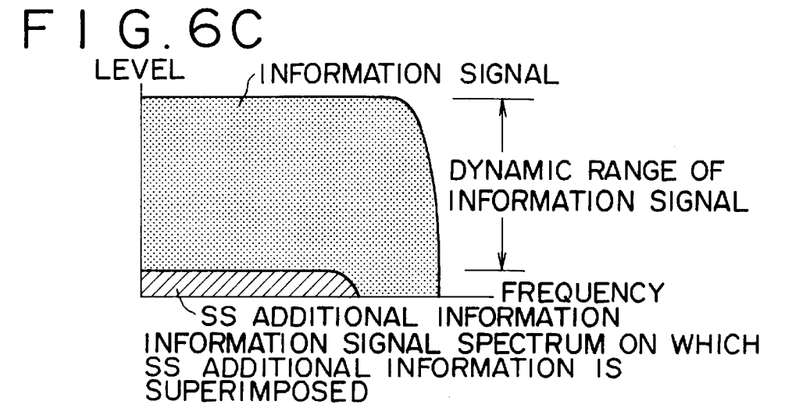

The spread spectrum signal, that is, the SS additional information SF1 is superimposed on an information signal by the signal superimposing section 15, however, in this case, as shown in FIG. 6C, the SS additional information SF1 is superimposed at a lower level than the dynamic range of a video signal as an information signal. The deterioration of an information signal can be mostly prevented by superimposing as described above. Therefore, if a video signal on which SS additional information SF1 is superimposed is supplied to a picture tube of a monitor and an image is reproduced, the image is hardly influenced by the SS additional information SF1 and a satisfactory reproduced image can be obtained.

Figure 6D:
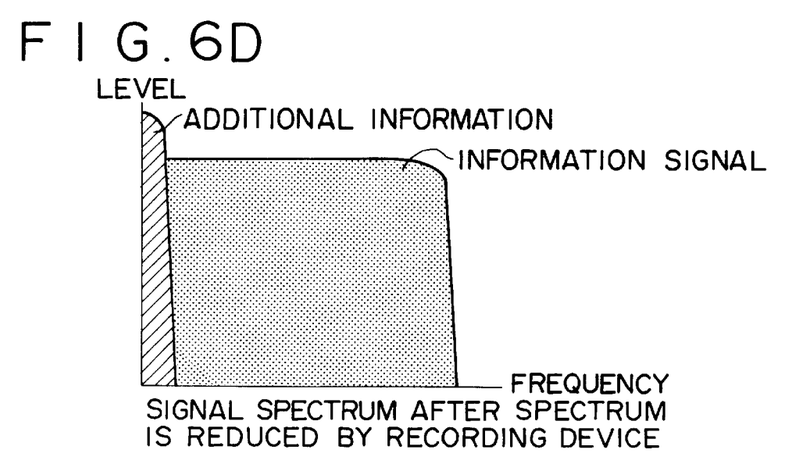

However, as described later, when the spectrum of SS additional information SF1 is reduced to detect the SS additional information SF1 in a recording device, the SS additional information SF1 is restored again as a narrow-band signal (additional information) as shown in FIG. 6D. The power of copy control information after the spectrum is reduced is higher than the power of an information signal by applying a sufficient spread spectrum factor and the copy control information can be detected.

In this case, as SS additional information SF1 is superimposed on a video signal at the same time and in the same frequency band, the deletion and modification of the SS additional information are disabled by a frequency filter and the simple replacement of information.

As described above, if a digital video signal is read from the recording medium 100 or a read digital video signal is recorded on another recording medium, new additional information the spectrum of which is spread and superimposed is extracted and copy preventing control according to the extracted additional information can be executed.

If new additional information the spectrum of which is spread and superimposed is extracted from a digital video signal, new additional information is generated in synchronization with the same PN code string as a PN code string for spreading a spectrum and new additional information the spectrum of which is spread and superimposed on the digital video signal can be extracted by reducing the spectrum using the PN code string.

As described above, the recording device 10 equivalent to the first embodiment generates new additional information based upon information obtained by reading additional information added to a digital video signal in case the supplied digital video signal is recorded on a recording medium. A digital video signal on which new additional information the spectrum of which is spread is superimposed obtained by spreading the spectrum of the above new additional information and superimposing the new additional information on the digital video signal can be recorded on a recording medium.

As described above, as the spectrum of new additional information superimposed on a digital video signal is spread and the new additional information is superimposed as a wide-band signal at a low level, a video signal read by the digital video signal is never deteriorated.

As new additional information the spectrum of which is spread is superimposed on a digital video signal at the same time and in the same frequency band, the new additional information cannot be falsified or deleted by a frequency filter or the replacement of an information signal.

As described above, as new additional information the spectrum of which is spread is superimposed on a digital video signal at the same time and in the same frequency band, additional information is never deleted even if the digital video signal on which the additional information the spectrum of which is spread is superimposed is converted from a digital signal to an analog signal.

Therefore, when a digital video signal on which new additional information the spectrum of which is spread is superimposed is read or copied, additional information superimposed on the digital video signal is extracted. Copy control according to the additional information is executed. The contents of the additional information are updated and new additional information is generated. The new additional information is added again and more flexible control such as the limitation of a generation is enabled. As described above, new additional information superimposed on a digital video signal can be securely obtained and utilized.

As described above, for new additional information FS1 generated by the new additional information generating section 12, new additional information FS1 may be also generated by changing additional information FS from the additional information reading section. Additional information FS may be also used for new additional information FS1 as it is, and different new additional information FS1 from additional information FS may be also generated or a part of additional information FS is changed and it may be also used for new additional information FS1.

Additional information FS and new additional information FS1 may also represent the same contents and may also represent separate contents. As described above, if additional information and new additional information represent separate contents, the quantity of additional information which can be added to a digital video signal which is an information signal to be recorded on a recording medium can be increased.

Additional information FS read by the additional information reading section 11 is supplied to the writing section 16 and copy control according to the additional information SF may be also executed by the writing section 16.

If the processing such as coding of a digital video signal to be recorded is required, the processing may be executed by the writing section 16.

Second Embodiment

Figure 7:
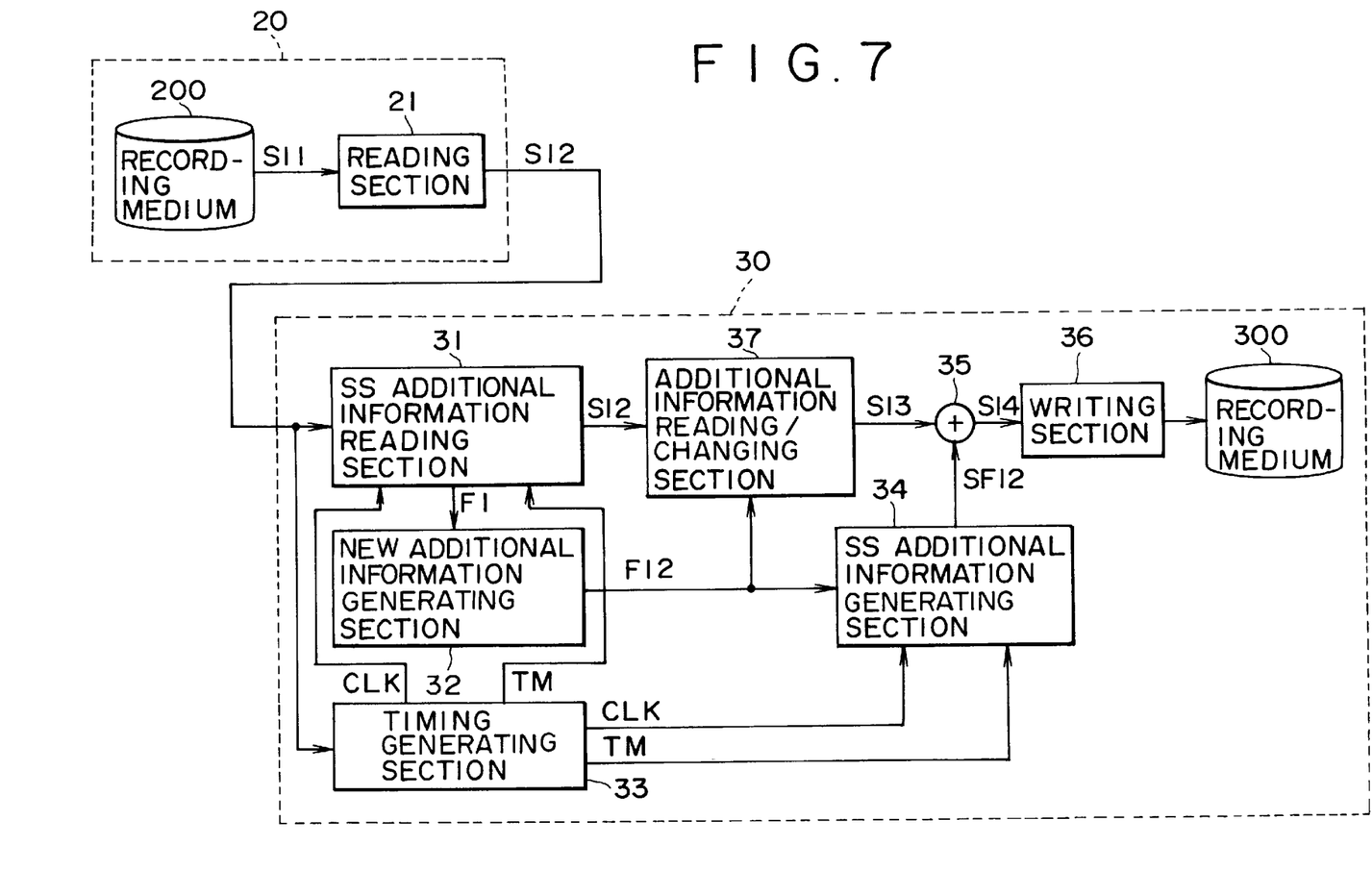
FIG. 7 is a block diagram for explaining an embodiment of an information signal recording system according to the present invention.

FIG. 7 is a block diagram for explaining an information signal copy system equivalent to a second embodiment. The information signal copy system equivalent to the second embodiment is constituted by an information signal reading device 20 connected via a network such as the Internet (hereinafter called only a reading device) and an information signal recording device 30 (hereinafter called only a recording device) as in the above first embodiment. This reading device 20 and this recording device 30 are applied to a device such as a personal computer which can send or receive an information signal via a network such as the Internet.

Reading Device 20

As shown in FIG. 7, the reading device 20 is provided with a reading section 21 and provided with a function as an information signal sending device for reading and sending an information signal recorded on a recording medium 200. In the second embodiment, the recording medium 200 is a disc information on which can be read by the reading device 20 such as CD-ROM and DVD.

In the second embodiment, a digital video signal is recorded on the recording medium 200. A digital video signal recorded on the recording medium 200 is recorded by the recording device 10 in the first embodiment for example.

Therefore, first additional information the spectrum of which is spread is superimposed on a digital video signal at the same time and in the same frequency band and recorded on the recording medium 200 and second additional information is added in another recording area on a track on which video data is to be recorded. That is, two types of additional information different in an adding method is superimposed and added on/to a digital video signal recorded on the recording medium 200.

The reading section 21 of the reading device 20 generates a digital read video signal S12 based upon a signal S11 obtained by reading information on the recording medium 200 and sends it to the recording device 30 via a network such as the Internet.

In this case, as described above, the spectrum of the first additional information is spread to be a wide-band signal at a low level and the first additional information is superimposed on a digital video signal at the same time and in the same frequency band.

Therefore, the first additional information never deteriorates an image reproduced based upon the digital video signal and is never falsified or deleted. Even if a digital video signal on which additional information 1 the spectrum of which is spread is superimposed is converted to an analog signal, the first additional information is never deleted.

Therefore, the first additional information the spectrum of which is spread and superimposed on a digital video signal is securely provided to the recording device 30 together with the digital video signal.

Recording Device 30

The recording device 30 in the second embodiment is provided with a function as an information signal receiving device for receiving and processing an information signal provided via a network such as the Internet. The recording device 30 in the second embodiment is provided with an SS additional information reading section 31, a new additional information generating section 32, a timing generating section 33, an SS additional information generating section 34, a signal superimposing section 35, a writing section 36 and an additional information reading/changing section 37 as in FIG. 7.

Each section except the SS additional information reading section 31 and the additional information reading/changing section 37 is the same as the corresponding each section of the recording device 10 in the above first embodiment.

A digital read video signal S12 from the reading device 20 is supplied to the SS additional information reading section 31 and the timing generating section 33 respectively of the recording device 30.

The timing generating section 33 is provided with the same constitution as that of the timing generating section 13 in the first embodiment described referring to FIG. 3 and generates a timing signal TM and a clock signal CLK used in each section of the recording device 30. Therefore, the timing generating section 33 will be explained assuming that it is provided with the constitution shown in FIG. 3.

A reference timing detecting section 131 of the timing generating section 33 extracts a synchronizing signal DK as a reference timing signal from a digital video signal S12 from the reading device 20. The synchronizing signal DK is supplied to a PLL circuit 132 and a timing signal generating section 133.

The PLL circuit 132 generates a clock signal CLK synchronized with a digital video signal S12 based upon a synchronizing signal DK from the reference timing detecting section 131 and supplies it to the timing signal generating section 133, the SS additional information reading section 31, the SS additional information generating section 34 and others.

The timing signal generating section 133 generates and outputs a timing signal TM and other various timing signals used by the SS additional information reading section 31, the SS additional information generating section 34 and others based upon a synchronizing signal DK from the reference timing detecting section 131 and a clock signal CLK from the PLL circuit 132.

In the second embodiment, these timing signal TM and clock signal CLK provide the same timing as a timing signal TM and a clock signal CLK used by the recording device 10 equivalent to the first embodiment.

As described above, a timing signal TM and a clock signal CLK generated by the timing generating section 33 are supplied to the SS additional information reading section 31 and the SS additional information generating section 34 as shown in FIG. 7.

The SS additional information reading section 31 reduces the spectrum of a digital read video signal S12, extracts first additional information F1 spectrum of which is spread and superimposed on the digital read video signal S12, supplies it to the new additional information generating section 32 and supplies the digital read video signal S12 to the additional information reading/changing section 37 as it is.

That is, the SS additional information reading section 31 is provided with a PN code generator and a multiplying section respectively not shown and provided with functions for generating a PN code string for reducing a spectrum with the same code pattern as that of a PN code string used for spreading the spectrum of first additional information the spectrum of which is spread and superimposed on a digital video signal S12 at the same timing based upon a timing signal TM and a clock signal CLK from the timing generating section 33 and for extracting the first additional information F1 by reducing the spectrum using this PN code string for reducing a spectrum.

The new additional information generating section 32 generates first new additional information F12 added to a digital video signal to be recorded on a recording medium 300 (hereinafter called first new additional information) based upon additional information F1 from the additional information reading section 31 and supplies it to the SS additional information generating section 34 and the additional information reading/changing section 37.

When additional information F1 supplied to the new additional information generating section 32 allows the copy of only a first generation, the new additional information generating section 32 generate and outputs first new additional information F12 representing the prohibition of copy as the new additional information generating section 12 in the first embodiment. When additional information F1 represents the prohibition or the allowance of copy, the additional information F1 representing the prohibition or the allowance of copy is output as it is as first new additional information F12.

When additional information F1 is not read from a digital video signal S12 by the SS additional information reading section 31 such as in case SS additional information is not added to the digital video signal S12, the new additional information generating section 32 detects it, generates and outputs the serial number of the recording device 30, ID number of a user of the recording device 10 for example and others as first new additional information F12. New additional information for generating these is recorded in a memory with which the new additional information generating section 32 is provided beforehand.

As described above, the new additional information generating section 32 generates first new additional information F12 based upon information obtained as a result of reading additional information by the SS additional information reading section 31 and supplies it to the SS additional information generating section 34 and the additional information reading/changing section 37.

The additional information reading/changing section 37 extracts second additional information added to video data from a digital video signal S12. The additional information reading/changing section 37 generates second new additional information based upon the extracted second additional information and first new additional information F12 from the new additional information generating section 32 (hereinafter called second new additional information) and adds it to the digital video signal S12 again.

In this case, the second new additional information is added to video data constituted by digital video signals S12. Hereby, in the second embodiment, second additional information added to a digital video signal S12 is rewritten to second new additional information. A digital video signal S13 generated by adding the second new additional information by the additional information reading/changing section 37 is supplied to the signal superimposing section 35.

In the meantime, the SS additional information generating section 34 is constituted as the SS additional information generating section 14 in the first embodiment, receives new additional information F12, a timing signal TM and a clock signal CLK and generates SS additional information SF12 which is a signal obtained by spreading the spectrum of new additional information F12. Therefore, the SS additional information generating section 34 in the second embodiment is provided with the same constitution as that shown in FIG. 4.

As shown in FIG. 4, the SS additional information generating section 34 is provided with a PN code generating section 141 and a multiplying section 142.

The PN code generating section 141 of the SS additional information generating section 34 is provided with the constitution described referring to FIG. 5 and generates a PN code string PS based upon a timing signal TM and a clock signal CLK. That is, the PN code generating section 141 generates a PN code string PS from the head every time a timing signal TM is supplied in synchronization with a clock signal CLK and supplies it to the multiplying section 142.

A new additional information string F12R generated by outputting each bit of first new additional information F12 from the new additional information generating section 32 by the predetermined number of clocks every time a timing signal TM is output in synchronization with a clock signal CLK is supplied to the multiplying section 142.

The multiplying section 142 generates a spread spectrum signal (SS additional information) SF12 which is first new additional information the spectrum of which is spread by multiplying a PN code string PS and a first new additional information string F12R and supplies it to the signal superimposing section 35.

The signal superimposing section 35 receives a digital video signal S13 to which second new additional information is added and digital SS additional information SF12 and generates a digital video signal S14 on which the digital SS additional information SF12 is superimposed.

The signal superimposing section 35 superposes SS additional information SF12 on a digital video signal S13 at the same time and in the same frequency band as the signal superimposing section 15 in the first embodiment. In this case, the SS additional information SF12 is superimposed on the digital video signal S1 by signal power lower than the dynamic range of the digital video signal S1.

As described above, a digital video signal S14 generated by the signal superimposing section 35 by superimposing the SS additional information SF12 on the digital video signal S13 is supplied to the weriting section 36.

The writing section 36 receives the digital video signal S14, converts it to a digital video signal for recording suitable for recording and writes the digital video signal for recording to the recording medium 300. Hereby, the digital video signal to which the second new additional information is added and on which the first new additional information the spectrum of which is spread is superimposed is recorded on the recording medium 300.

In the second embodiment, it is described that the first new additional information superimposed on the digital video signal as SS additional information SF12 is generated based upon the first additional information the spectrum of which is spread and superimposed on the digital video signal S12, however, the present invention is not limited to this.

For example, first new additional information may be also generated based upon information obtained by reading first additional information by the SS additional information reading section 31 and information obtained by reading second additional information by the additional information reading/changing section 37 and first new additional information may be also generated based upon only information obtained by reading second additional information by the additional information reading/changing section 37.

It is described above that the second new additional information is generated based upon the first new additional information F12 and the second additional information, however, the present invention is not limited to this. For example, the above second new additional information may be also generated based upon information obtained by reading the first additional information by the SS additional information reading section 31 and may be also generated based upon information obtained by reading second additional information by the additional information reading/changing section 37.

As described above, second new additional information may be also generated based upon first new additional information generated based upon information obtained by reading first additional information by the SS additional information reading section 31 and information obtained by reading second additional information by the additional information reading/changing section 37 and information obtained by reading the second additional information by the additional information reading/changing section 37.

First and second additional information may be also superimposed and added on/to a digital video signal as first and second new additional information as they are without generating first and second new additional information.

Another information different from the first and second additional information is generated, may be also added as additional information, a part of original first and second additional information is changed and may be also superimposed or added on/to a digital video signal.

If the spectrum of first new additional information is spread and the spread spectrum's first new additional information is superimposed on a digital video signal using a PN code string different from a PN code string used for spreading the spectrum of additional information, the spectrum of which is spread and added to a digital read video signal S12 the SS additional information generating section 34, for example PN code strings different in a phase even if the PN code strings belong to the same series and PN code strings different in a series, the spread spectrum's first new additional information can be superimposed on an information signal without being mistaken for the already superimposed spread spectrum's first additional information and if necessary, can be extracted.

In the second embodiment, it is described that the spectrum of first new additional information is spread and the spread spectrum's first new additional information is superimposed on a digital video signal, however, the present invention is not limited to this, SS additional information for negating the spread spectrum's first additional information superimposed on a digital video signal is generated and after the spread spectrum's first additional information already superimposed is deleted by subtracting the above first additional information from the digital video signal, the spectrum of first new additional information may be also spread and superimposed.

As described above, in the case of an information signal recording control system in the second embodiment, the recording of a digital video signal can be controlled based upon first additional information the spectrum of which is spread and superimposed on the digital video signal and information obtained by detecting second additional information added to video data composed of digital video signals and new additional information can be superimposed and added on/to a digital video signal to be recorded on a recording medium 400.

Other Examples of SS Additional Information Generating Section

In the above embodiments, as described referring to FIG. 4, the SS additional information generating sections 14 and 34 spread the spectrum of additional information composed of small bits such as one and two bits by one PN code and generate SS additional information SF1 and SF12, however, as described below, the spectrum of additional information is not spread but a PN code itself or a mixture of a PN code and another code may be also superimposed on a digital video signal as additional information representing the contents of copy control.

In the above description, additional information FS is equivalent to new additional information FS1 and F12 generated by the above new additional information generating sections 12 and 32 and SS additional information SF is equivalent to spread spectrum signals (SS additional information) SF1 and SF12 the spectrum of which is spread by the SS additional information generating sections 14 and 34.

Figure 8:
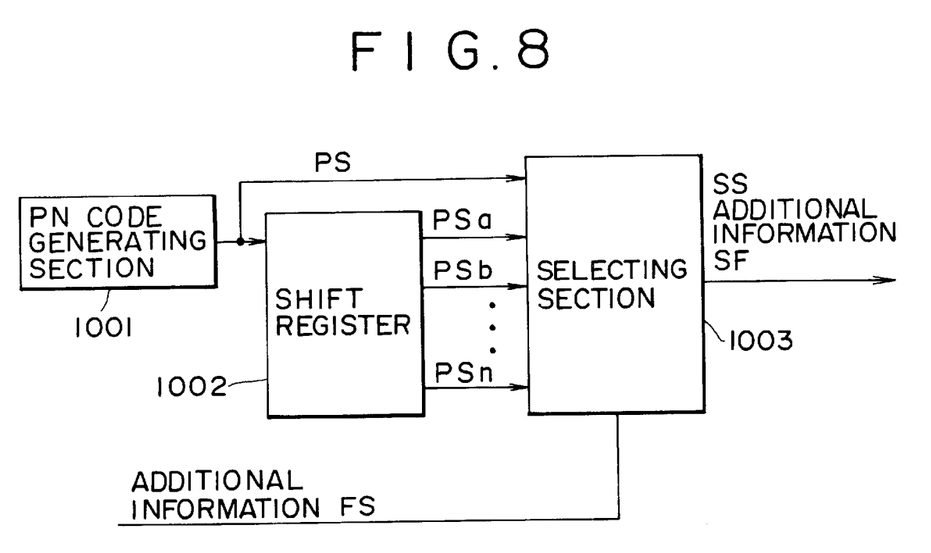
FIG. 8 is a block diagram for explaining another example of the SS additional information generating section.

FIG. 8 shows an embodiment of the SS additional information generating section using PN codes different in a phase.

In the embodiment, a PN code PS output from a PN code generating section 1001 is supplied to a selecting section 1003 and is supplied to a shift register 1002. PN codes PSa, PSb, . . . , PSn obtained by sequentially shifting a PN code PS according to a clock signal and respectively different in a phase are output from the shift register 1002 and are respectively supplied to the selecting section 1003.

Additional information FS as a selection control signal is supplied to the selecting section 1003. The selecting section 1003 selects a PN code of one phase according to the contents of control represented in additional information FS which is a selection control signal, that is, the prohibition or the allowance of copy out of PN codes PS, PSa, PSb, . . . , PSn of plural phases and outputs it as SS additional information SF.

Figure 9:
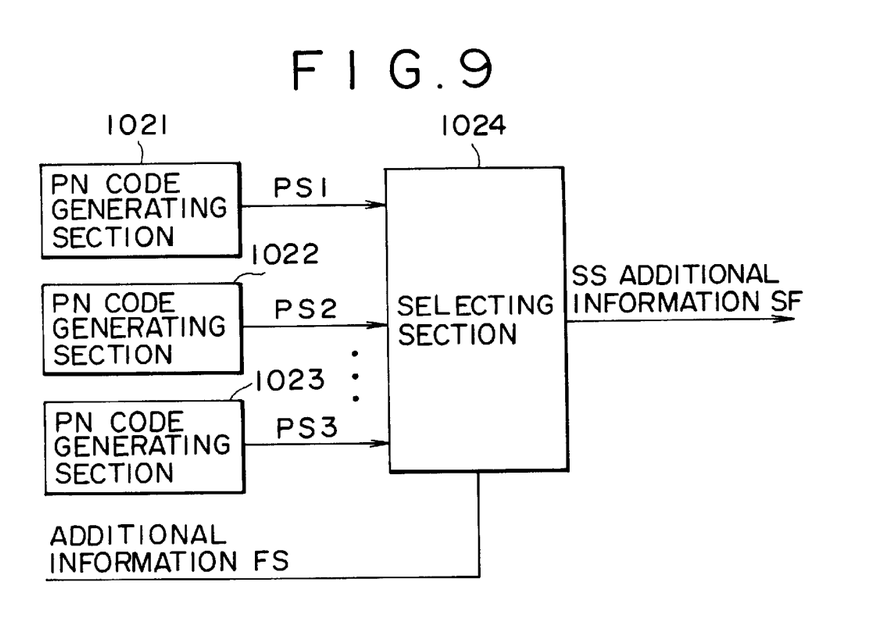
FIG. 9 is a block diagram for explaining further another example of the SS additional information generating section.

FIG. 9 shows an embodiment of the SS additional information generating section using PN codes different in a series.

In the embodiment, plural PN code generators 1021, 1022 and 1023 for generating PN codes PS1, PS2 and PS3 different in a series are provided. Output from each PN code generator 1021, 1022 and 1023 is input to the selecting section 1024.

Additional information FS is supplied to the selecting section 1024 as a selection control signal. The selecting section 1024 selects a PN code of one series according to the contents of control represented in additional on information FS which is a selection control signal, that is, the prohibition or the allowance of copy out of PN codes PS1, PS2 and PS3 of plural series and outputs it as SS additional information SF.

Figure 10:
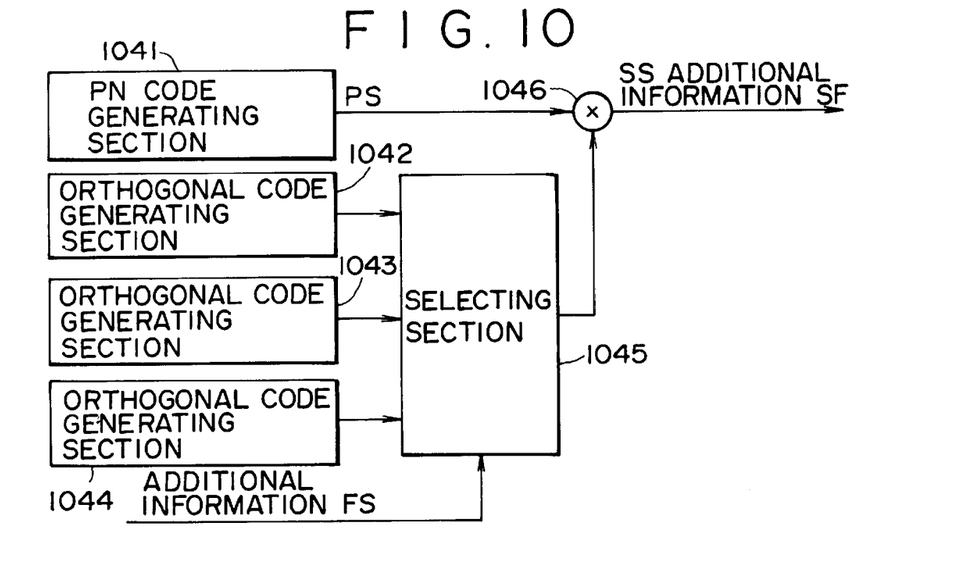
FIG. 10 is a block diagram for explaining the other example of the SS additional information generating section.

FIG. 10 shows an embodiment of the main part of an SS additional information generating/superimposing device in case one type of PN code and plural orthogonal codes are used.

In the embodiment, one PN code generating section 1041 and orthogonal code generating sections 1042, 1043 and 1044 for respectively generating orthogonal codes mutually different are provided. A PN code PS output from the PN code generating section 1041 is input to a multiplying section 1046. Different orthogonal codes respectively from the orthogonal code generating sections 1042, 1043 and 1044 are input to the selecting section 1045. Additional information FS is supplied to the selecting section 1045 as a selection control signal.

The selecting section 1045 outputs one orthogonal code according to the contents of control represented in additional information FS which is a selection control signal, that is, the prohibition or the allowance of copy out of plural different orthogonal codes to the multiplying section 1046. The multiplying section 1046 multiplies the above PN code PS and the selected orthogonal code and outputs the result of the multiplication as SS additional information SF.

Figure 11:
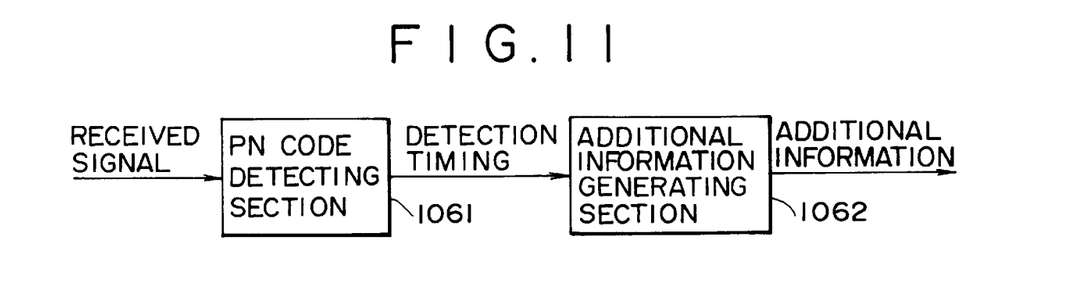
FIG. 11 is a block diagram showing an example of an SS additional information detecting section.

Detecting SS Additional Information Corresponding Other Examples of SS Additional Information Generating Section If the SS additional information generating sections respectively shown in FIGS. 8 to 10 are used, the detection of spread spectrum additional information is executed as follows:

FIG. 11 shows an example of an SS additional information detecting section for detecting additional information from a video signal on which SS additional information for which PN codes of different phases shown in FIG. 8 are used is superimposed.

In the SS additional information detecting section in this example, a digital read video signal (a received signal) on which SS additional information is superimposed is input to a PN code detecting section 1061. In the PN code detecting section 1061, the timing of a PN code is detected and the result is input to an additional information generating section 1062. The additional information generating section 1062 specifies the contents of copy control represented in additional information based upon difference in timing between PN codes, generates additional information to be supplied to a recording control section according to the result of the specification and outputs it.

Figure 12:
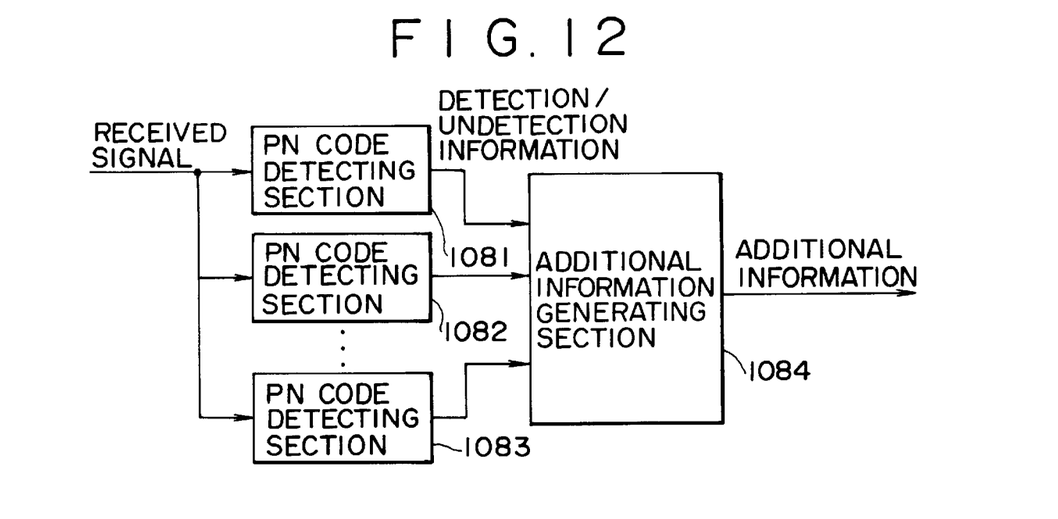
FIG. 12 is a block diagram showing another example of the SS additional information detecting section.

FIG. 12 shows an example of an SS additional information detecting section for detecting additional information from a video signal on which SS additional information for which PN codes of different series shown in FIG. 9 or a mixture of one type of PN code and plural orthogonal codes shown in FIG. 10 are used is superimposed.

In the SS additional information detecting section in this example, a digital video signal on which SS additional information is superimposed (a received signal) is input to PN code detecting sections 1081, 1082 and 1083. The PN code detecting sections 1081, 1082 and 1083 respectively detect a different PN code or a code obtained by multiplying one type of PN code and a different orthogonal code. The output is input to an additional information generating section 1084. The additional information generating section 1084 specifies the type of additional information based upon which code string is detected, generates additional information to be supplied to a recording control section according to the result of the specification and outputs it.

If the above SS additional information generating section and the above SS additional information detecting section are used, plural different additional information can be also simultaneously added by using PN codes of different phases or a code obtained by combining an orthogonal code and a PN code in spreading the spectrum of additional information showing the contents of copy control and to be superimposed.

In the above first and second embodiments, a PN code of M series is used, however, the present invention is not limited to this and various spreading codes such as a code of a gold code series may be used.

In the above first and second embodiments, a timing signal and a clock signal are generated using a synchronizing signal extracted from a digital video signal for a reference signal, however, the present invention is not limited to this.

Various timing used by each section of the recording devices 10 and 30 in the above first and second embodiments may be also controlled by a system controller for example without using a synchronizing signal from a digital video signal as a reference signal.

In the above first and second embodiments, if the coding of a digital video signal as an information signal and the compression of a signal are required, the above coding and compression can be executed by the reading section 21 of the recording device and the writing sections 16 and 36 of the recording device.

As described above, if 10-bit data is recorded in 8 bits for example in case a digital video signal is compressed, the deterioration and the deletion of SS additional information can be prevented by superimposing the SS additional information at the time of 10 bits before compression even if the compressed digital video signal is restored.

Also, if compression in which S-N ratio of a digital video signal is deteriorated for example is done, SS additional information can be also inserted into higher order bits without limiting to low order bits such as LSB.

The above examples show a case that an information signal is a digital video signal, however, the present invention can be applied to an audio signal and various information signals in a computer program and others. An information signal may be also an analog signal without limiting to a digital signal.

Additional information is not limited to copy control information and various information such as control information, related information, the serial number of a recording device, ID of a user, a recorded date, an authorized number and copyright information can be added and superimposed to/on an information signal.

In the above first and second embodiments, it is described that the recording mediums 100, 200 and 300 are a disc such as CD-ROM and DVD, however, they are not limited to CD-ROM and DVD.

For a recording medium, various recording mediums such as an optical disc, a magneto-optical disc, a magnetic disc and a magnetic recording medium such as a video tape may be used.

In the above first and second embodiments, it is described that the recording devices 10 and 30 and the reading device 20 are a personal computer which sends and receives data via a network and others, however, the recording device and the reading device are not limited to this.

The present invention can be applied to various recording devices and recording/reading devices such as a recording device and a recording/reading device for DVD, digital VTR, VTR and a cassette tape recorder.

As described above, according to the information signal recording device according to the present invention, as the frequency band of additional information is spread by spreading the spectrum's and the spread spectrum additional information is superimposed on an information signal at the same time and in the same frequency band, the falsification and the deletion of additional information are disabled by a frequency filter and the simple replacement of an information signal. Even if an information signal is a digital signal and it is converted to an analog signal, additional information can be prevented from being deleted. As described above, the survival rate of additional information superimposed on an information signal can be enhanced.

As additional information the falsification and the deletion of which are disabled and with high signal strength can be added to an information signal as described above, reliable devices and systems in which the deletion and others of additional information never occur can be realized.

As the spectrum of additional information is spread to be a wide-band and low-level signal, the additional information can be superimposed on an information without deteriorating the information signal.

According to the information signal recording device according to the present invention, as additional information of the same contents is added in different adding methods, the reliability and strength of additional information added to an information signal can be enhanced. As falsification can be checked by equalizing additional information added to an information signal in different adding methods, a range in which additional information is utilized can be widened. Further, additional information different in contents can be also added to an information signal in different adding methods and in this case, the total quantity of additional information added to an information signal can be increased.

According to the information signal recording device according to the present invention, plural additional information can be also readily simultaneously superimposed on the same information signal and utilized by using spreading codes different in a phase or plural different spreading codes such as a spreading code and an orthogonal code.

According to the information signal recording device according to the present invention, as additional information the spectrum of which is spread is superimposed on an information signal at a low signal level, the additional information can be prevented from having an effect upon the information signal such as deteriorating the information signal.

According to the information signal recording device according to the present invention, additional information can be promptly extracted by synchronizing a spreading code for spreading the spectrum of additional information and a spreading code for reducing the spectrum when the spectrum is reduced.

What is claimed is:

1. An information signal processing unit, comprising:

reading means for receiving a digital information signal on which an additional information signal with a spread spectrum is superimposed and reading said additional information signal from said information signal;

additional information signal generating means for generating a new additional information signal based upon said additional information signal read by said reading means;

spreading means for spreading said spectrum of said new additional information signal generated by said additional information signal generating means; and superimposing means for superimposing said new additional information signal wherein said spectrum of said new additional information signal is spread by said spreading means on said information signal and outputting it.

2. The information signal processing unit as claimed in claim 1, wherein:

recording means for recording an output signal from said superimposing means is provided.

\* \* \* \* \*